United States Patent [19]
Johansson et al.

[11] Patent Number: 5,481,579
[45] Date of Patent: Jan. 2, 1996

[54] LATCHING AND LIFTING MECHANISM FOR A NUCLEAR REACTOR FUEL BUNDLE

[75] Inventors: Eric B. Johansson; Harold B. King, both of Wrightsville Beach, N.C.

[73] Assignee: General Electric Company, Schenectady, N.Y.

[21] Appl. No.: 380,587

[22] Filed: Jan. 30, 1995

[51] Int. Cl.⁶ .................................................. G21C 3/33
[52] U.S. Cl. .................................... 376/446; 376/444
[58] Field of Search .................................. 376/446, 444, 376/440

[56] References Cited

U.S. PATENT DOCUMENTS

| | | | |
|---|---|---|---|
| 3,775,249 | 11/1973 | Clapham | 376/446 |
| 4,038,137 | 7/1977 | Pugh | 376/446 |
| 4,652,426 | 3/1987 | Boyle et al. | 376/444 |

Primary Examiner—Daniel D. Wasil
Attorney, Agent, or Firm—Nixon & Vanderhye

[57] ABSTRACT

A fuel bundle assembly for a nuclear reactor, wherein a plurality of fuel rods and at least one water rod extend between an upper tie plate and a lower tie plate, includes upper end plugs secured to a pair of water rods and having axial cut-out portions defined by upper and lower shoulders. A latching mechanism for securing the pair of water rods to the upper tie plate includes a latch bar mounted on an upper surface of the upper tie plate and rotatable into and out of the cut-out portions in the end plugs when the end plugs extend above the upper surface of the tie plate upon installation of the upper tie plate on the fuel bundle assembly. A locking pin is provided which prevents the latch bar from being accidentally unlocked.

20 Claims, 12 Drawing Sheets

Fig 15B
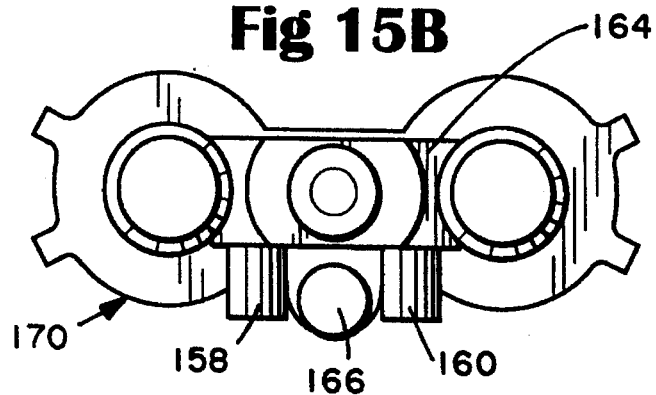
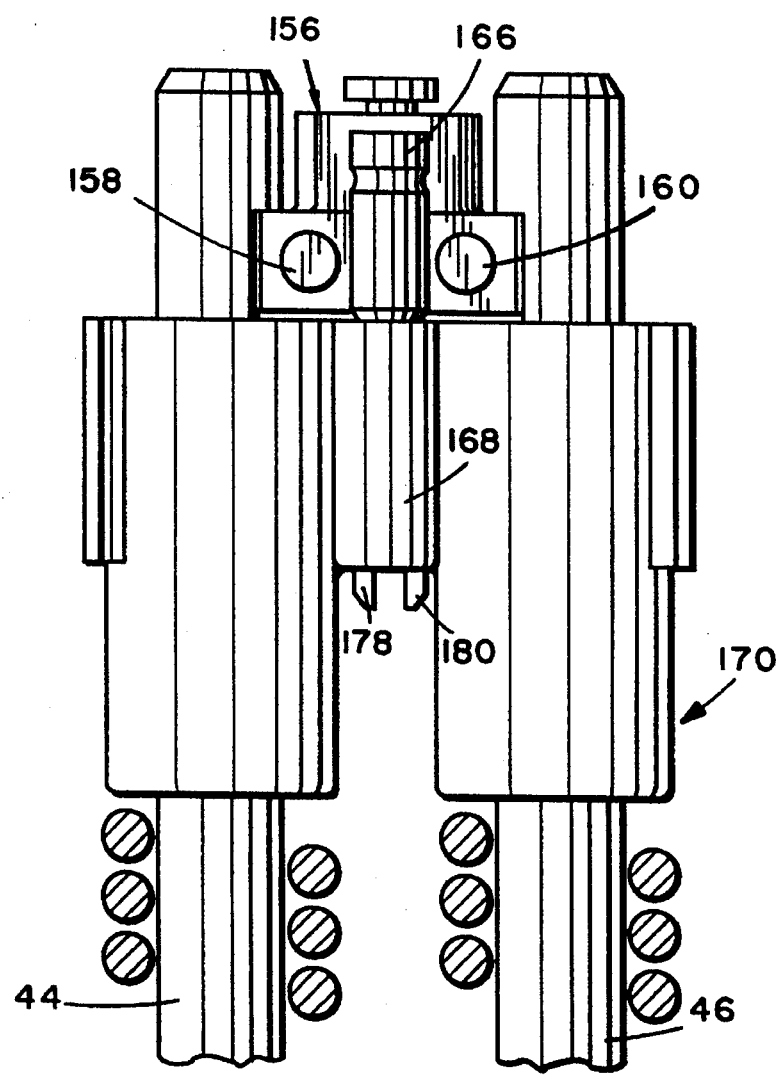
Fig 15A

Fig 16A
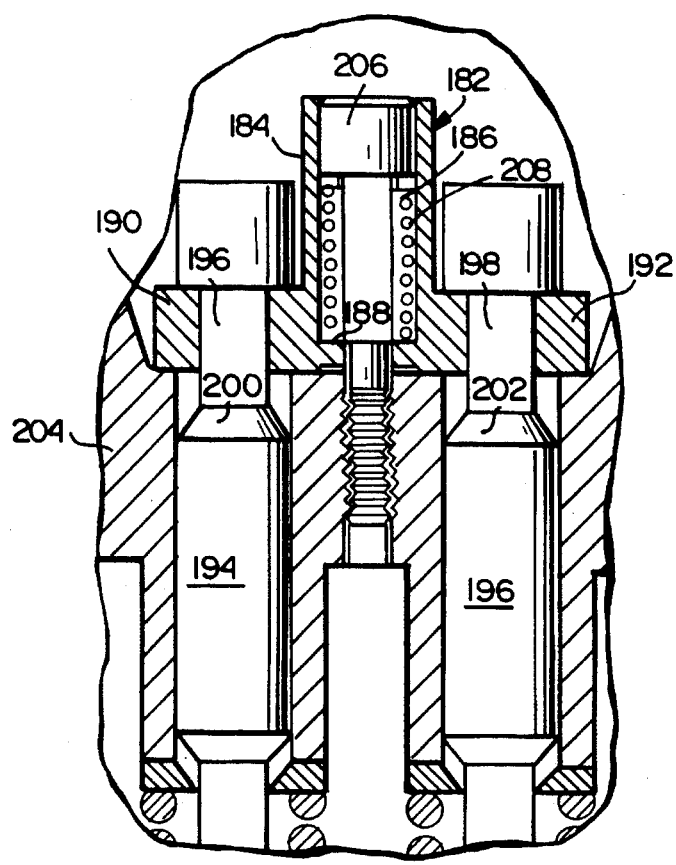
Fig 16B
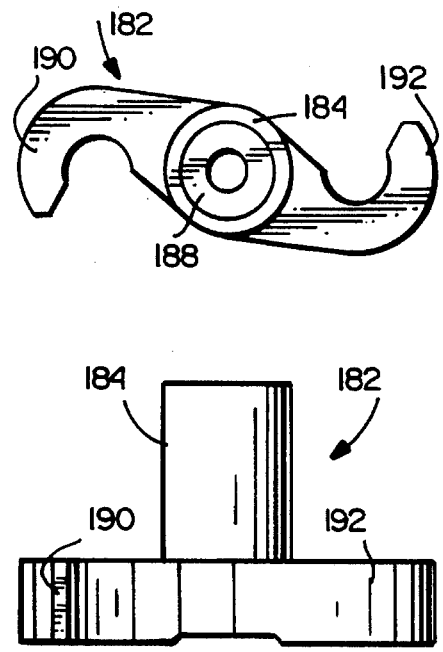
Fig 16C
Fig 16D
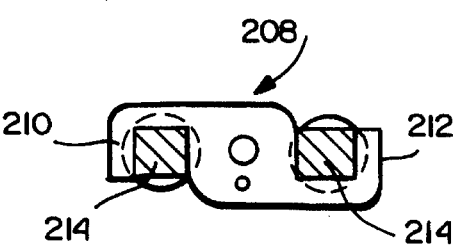

LATCHING AND LIFTING MECHANISM FOR A NUCLEAR REACTOR FUEL BUNDLE

TECHNICAL FIELD

This invention relates generally to boiling water nuclear reactors and, more specifically, to a latching and lifting mechanism facilitating removal of fuel rods from fuel bundle assemblies within such reactors.

BACKGROUND

It is well known that fuel rods in boiling water reactor (BWR) fuel bundles are supported on a lower tie plate and extend upwardly to an upper tie plate. Between the upper and lower tie plates, the fuel rods are supported laterally by a plurality of spacers. In some BWR, bundle designs, the upper and lower tie plates are directly connected to each other by several special fuel rods, called tie rods. These tie rods have lower end plugs which are threadably secured in the lower tie plate. The tie rods also have threaded upper end plugs which extend through the upper tie plate. Conventional nuts are used on these upper end plugs to secure the tie rods to the upper tie plate. Special lock washers are used to prevent rotation of the nuts. Specifically, the washers are formed with tabs which are bent upward to lock the nuts in position and thus prevent rotation.

The upper tie plate typically includes a handle extending upwardly from its base. To lift the fuel bundle, a grapple engages this upwardly extending handle. The weight of the fuel rods is transmitted to the lower tie plate, through the tie rods to the upper tie plate, and then to the handle.

Occasionally, a fuel bundle must be disassembled partway through its service life or at the end of its use. At such time, the lock washer tabs are bent to free the nuts, and the nuts and washers are then removed. Thereafter, the upper tie plate can be removed followed by extraction of one or more fuel rods as necessary.

The invention here relates to a different constructions for transferring the fuel bundle weight to the upper tie plate, and for latching and unlatching the upper tie plate from the fuel bundle to facilitate removal of fuel rods from the bundle.

DISCLOSURE OF THE INVENTION

In accordance with this invention, highly reliable latching and lifting mechanisms are provided for fuel bundles in boiling water reactors. More specifically, the invention here relates to BWR fuel bundles which incorporate a pair of large water rods, each occupying a space which would otherwise be occupied by four fuel rods. The water rods typically have lower end plugs inserted into the lower tie plate and upper end plugs inserted into the upper tie plate. These end plugs are free to slide vertically within holes in the tie plates.

The present invention utilizes these water rods to lift the fuel bundle. To this end, the lower water rod end plugs are rigidly attached to the lower tie plate by suitable means (e g, by threaded attachment), but the specific manner of attachment to the lower tie plate forms no part of this invention per se. A latching mechanism (three embodiments are disclosed) is utilized to attach the upper end plugs to the upper water rod tie plate Thus, when the fuel bundle is lifted, the load is transferred from the fuel rods to the lower tie plate, through the water rods to the latching mechanism and then to the upper tie plate and finally to the lifting handle.

In an exemplary embodiment, the upper tie plate is formed with an enlarged double boss for receiving the end plugs for the pair of water rods. This double boss is formed integrally with the tie plate and is connected to the other fuel rod bosses in the upper tie plate by a series of relatively narrow webs similar to those webs which interconnect the various fuel rod bosses. This enlarged double boss is formed with a centering hole located between the pair of bosses and adapted to receive a center post utilized to center and secure a latching bar on the double boss. The double boss area is also formed with a forwardly extending projection midway between the bosses projecting normal to a line between the boss centers. The projection has a vertical hole on a center axis which is parallel to and located forwardly of the centering hole.

At the same time, the upper ends of the water rods are provided with end plugs having upper ends formed with axially extending cut-outs which, in the assembled orientation, face each other. A latching bar in accordance with this first exemplary embodiment is formed with a vertically extending central through bore adapted to receive the centering pin, enabling the latching bar to be properly oriented on the double boss of the upper tie plate. The latching bar is also formed with lower ends laterally projecting in opposite directions and, as explained below, rotatable into and out of the cut-outs provided on the end plugs of the water rods. This latching bar is also formed with a forwardly extending projection containing a through hole, the center line or axis of which may be aligned with the projection hole in the enlarged double boss. The lower surface of the latching bar is provided with a centrally located, elongated rib extending from front to back in a direction perpendicular to the oppositely and outwardly extending lower end portions of the latching bar.

With the latching bar in place on the double boss, and after the upper tie plate is lowered into position such that the end plugs (including the axial cut-outs) of the water rods project through the double boss of the upper fie plate, the latching bar may be rotated such that the oppositely extending lower end portions move into the cut-out areas of the end plugs. Springs are located on the end plugs so that when the lower tie plate is lowered into position as described above, the springs will exert a biasing force in the opposite direction. Accordingly, when the latching bar is rotated into position, dove, award pressure on the lower-tie plate is released, causing the tie plate and latching bar to be resiliently biased upwardly against shoulders formed in the end plugs. As a result, the upper tie plate, water rods and lower tie plate are now rigidly connected. A locking pin is then used to secure the latching bar against rotation relative to the tie plate, thereby preventing accidental rotation of the latching bar out from its locking position. At the same time, the locking pin is designed to prevent accidental withdrawal of the pin itself from the latching bar through the utilization of a compression ring described in greater detail below.

In an alternative embodiment of the invention, the latching bar and locking pin are modified so that the locking pin is spring loaded in a downward direction, again preventing accidental withdrawal of the pin.

In a third exemplary embodiment of the invention, the locking pin is provided with a pair of spring fingers which, in combination with a pair of adjacent stops, lock the latching bar against rotation and also prevent accidental withdrawal of the pin.

In a fourth exemplary embodiment, the water rod end plugs are modified to include 360° grooves, and the latch bar is of a "double horseshoe-type" where oppositely facing recesses on the latch bar are pivoted into locking engagement with the reduced diameter grooves in the end plugs The advantage of this approach is that the 360° circumferential grooves on the end plugs makes the angular orientation of the water rods unimportant, at least insofar as the reliability of the locking mechanism per se is concerned. By making the radial position unimportant, the tolerances in the water rod will not need to be as tight, thus enhancing the manufacturability of the water rods. The anti-rotation feature of the water rods in this embodiment may be achieved by keying in the lower or upper tie plate with shaped holes. Another advantage of the above described "double horseshoe type" latch bar is that additional surface engagement of the locking surfaces can be achieved.

In a variation of this fourth embodiment, the oppositely facing recesses in the latch bar are generally square, and the 360° grooves or cut-outs in the water rod end plugs are also squared at the base of the respective grooves. This arrangement not only provides even more surface locking engagement, but also provides locked radial positioning of the water rods. This, then, simplifies the tie plate manufacturing in that no shaped holes for keyed positioning of the water rod end plugs is required.

Additional objects and advantages of the invention will become apparent from the detailed description which follows.

BRIEF DESCRIPTION OF THE DRAWINGS

FIGS. 15A and 15B are views similar to FIGS. 9A, 9B but illustrate the third embodiment of the invention in the latched position;

FIG. 16A is a partial side section illustrating a latch bar construction in accordance with a fourth exemplary embodiment of the invention;

FIG. 16B is a plan view of the latch bar included in FIG. 16A;

FIG. 16C is a front elevation of the latch bar shown in FIG. 16B; and

FIG. 16D is a plan view, partly in section, illustrating a variation of the latch bar shown in FIG. 16B.

BEST MODE FOR CARRYING OUT THE INVENTION

Figure 1:
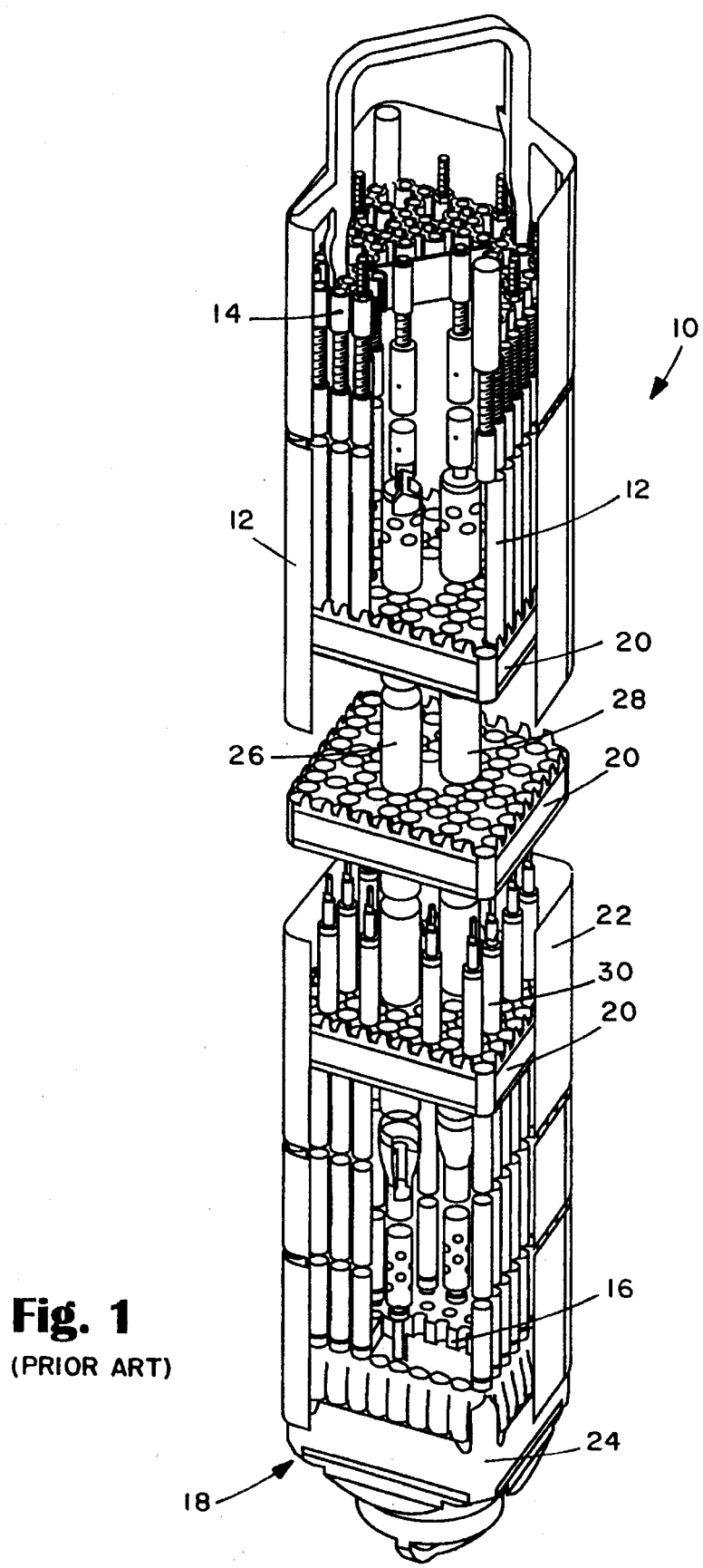
FIG. 1 is a partial perspective view, broken away to illustrate the components of a conventional fuel bundle assembly for a boiling water nuclear reactor.

Referring now to FIG. 1, a representative example of a fuel assembly is shown generally at 10. The assembly includes a plurality of fuel rods 12 forming a bundle. The rods 12 are connected at their upper ends to an upper tie plate 14 and are supported at their lower ends by a lower tie plate grid, generally designated 16, which forms part of a lower tie plate assembly, generally designated 18. Spacers 20 are arranged at a plurality of vertically spaced locations to maintain lateral spacing of the fuel rods 12 relative to one another. The fuel bundle is disposed within a fuel bundle channel 22 whereby coolant water introduced through the bottom nozzle or inlet opening of the tie plate assembly 18 flows upwardly through a flow volume defined by a peripheral wall 24 of the lower tie plate assembly 18, through the lower tie plate grid 16, and then along and about the fuel rods 12 enclosed by the channel 22.

As illustrated in FIG. 1, many of the fuel rods 12 are omitted so that water rods 26 and 28 may be seen. The water rods 26 and 28 have lower end plugs which are seated in the lower tie plate grid 16 by any suitable means, such as a threaded connection (not shown).

The fuel rods include both full length rods 12 extending between the lower tie plate grid 16 and the upper tie plate 14, and partial length rods 30. The partial length rods 30 extend from the lower tie plate grid 16 to a spacer 20' shown just below the upper ends of the partial length rods 30 in FIG. 1. The spacers 20 located above the partial length rods are provided with enlarged apertures overlying each of the partial length rods. Likewise the upper tie plate 14 includes enlarged apertures overlying each partial length rod. The partial length rods are set forth in both function and purpose in a patent application entitled Two-Phase Pressure Drop Reduction, BWR Assembly Design filed Apr. 4, 1988, No. 176,975, owned by the common Assignee herein.

Figure 2:
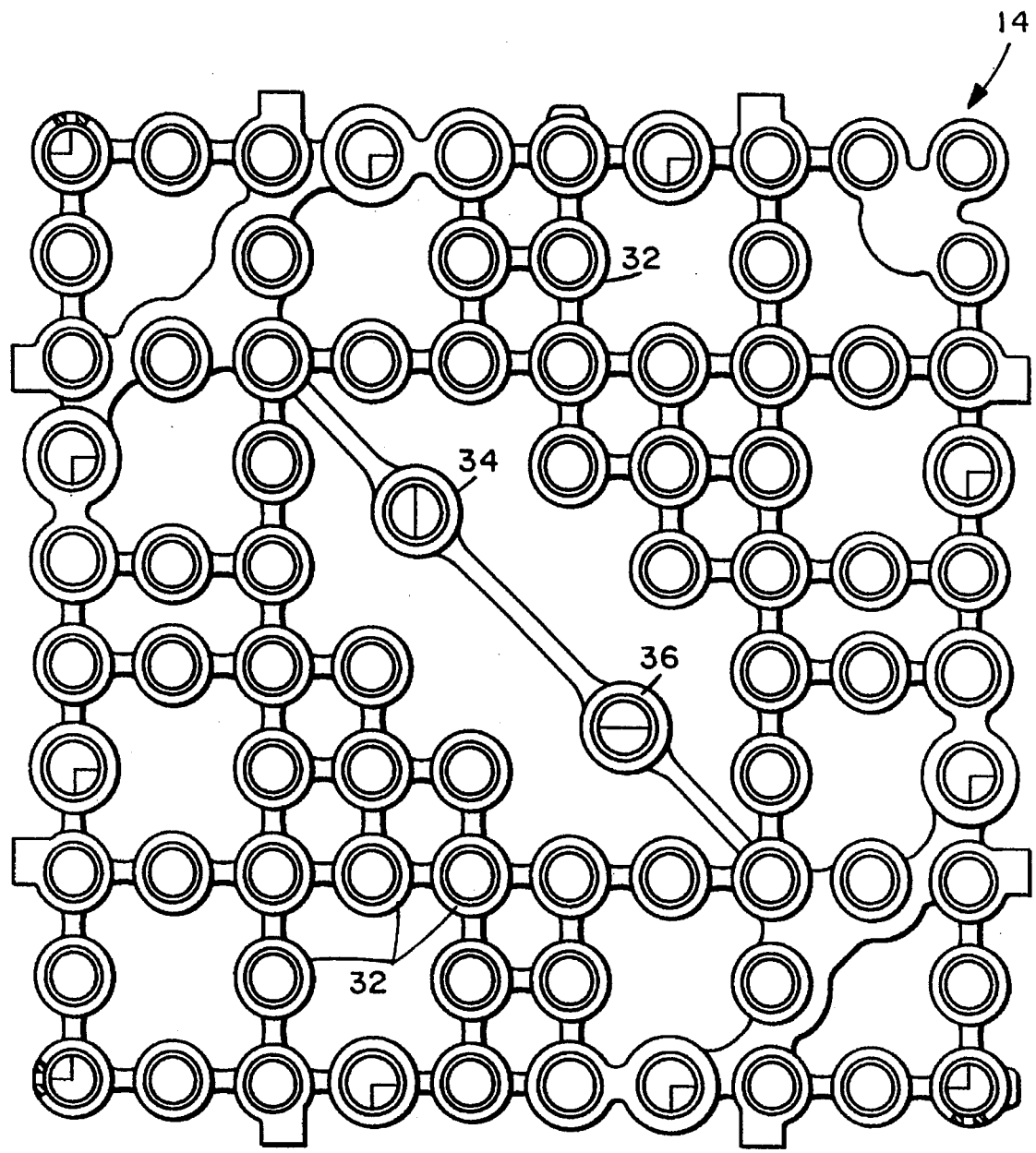
FIG. 2 is a bottom plan view of a conventional upper tie plate as used in the fuel bundle of FIG. 1.

FIG. 2 illustrates a conventional arrangement of fuel rod bosses 32, as viewed from the underside of the upper tie plate 14. In addition to the fuel rod bosses 32, the upper tie plate also provides a pair of diagonally related bosses 34 and 36 for receiving the end plugs of the water rods 28 and 30, respectively.

Figure 3:
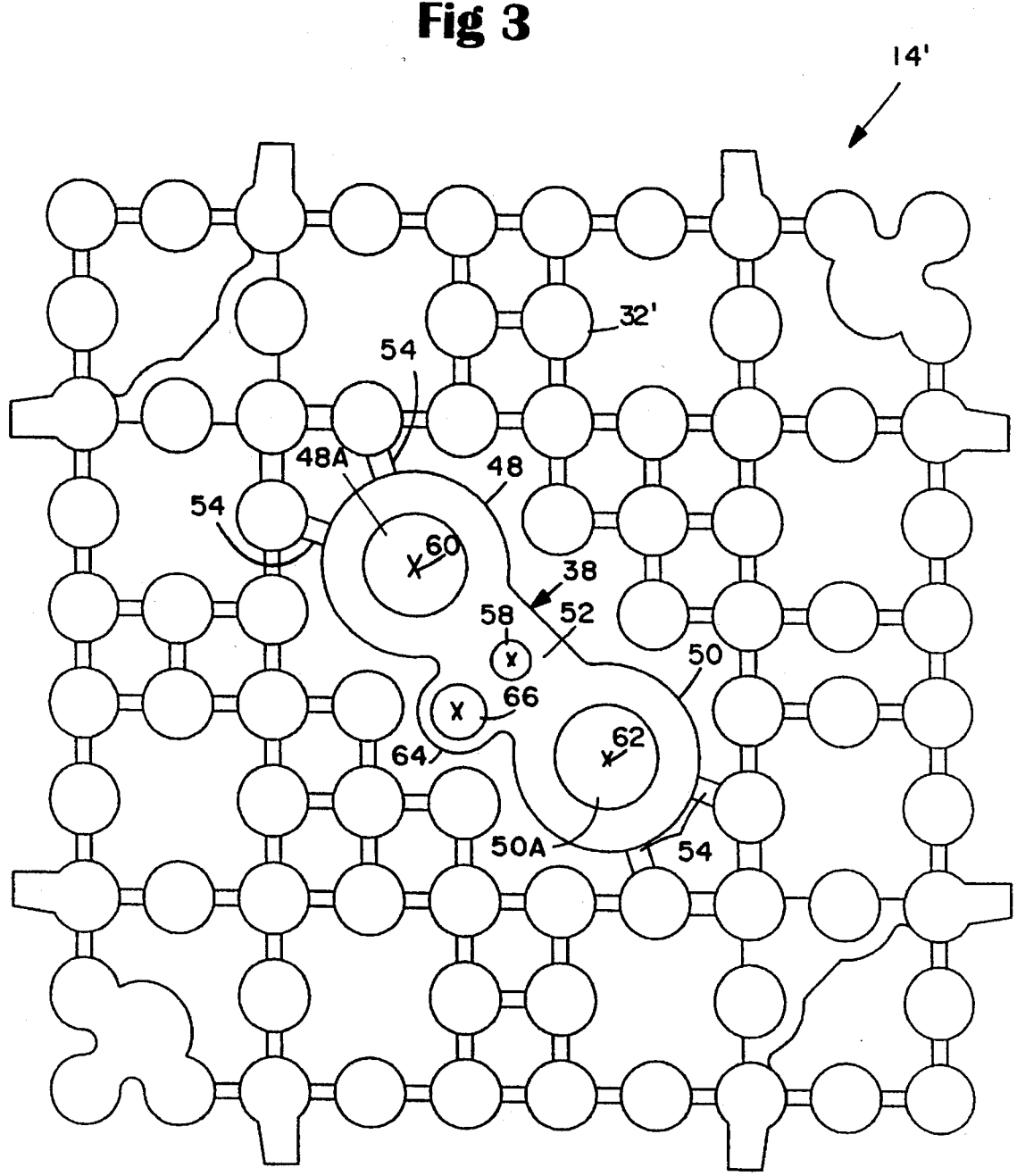
FIG. 3 is a bottom plan view of an upper tie plate in accordance with this invention.

Referring now to FIG. 3, the lower side of an upper tie plate 14' in accordance with this invention includes conventional bosses 32' for the fuel rods, and an enlarged double boss 38 for receiving the end plugs 68 of a pair of water rods 44, 46 (see FIG. 5, 8B) in accordance with this invention. This double boss 38 includes substantially cylindrical boss portions 48 and 50, associated through holes 48A, 50A, respectively, and a connecting web portion 52. The double boss 38 is connected to the other fuel rod bosses 32' in the upper tie plate by a series of relatively narrow webs 54, but it will be appreciated that the double boss extends downwardly below the plane defined by the lowermost edges of fuel rod bosses 32', as seen for example in FIG. 4A.

Figure 4B:
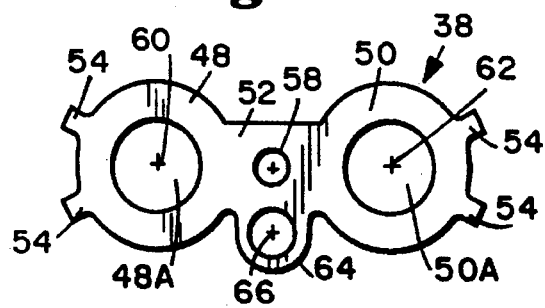
FIG. 4B is a top plan view of the water rod bosses illustrated in FIG. 4A, but with a center post removed for clarity.
Figure 4A:
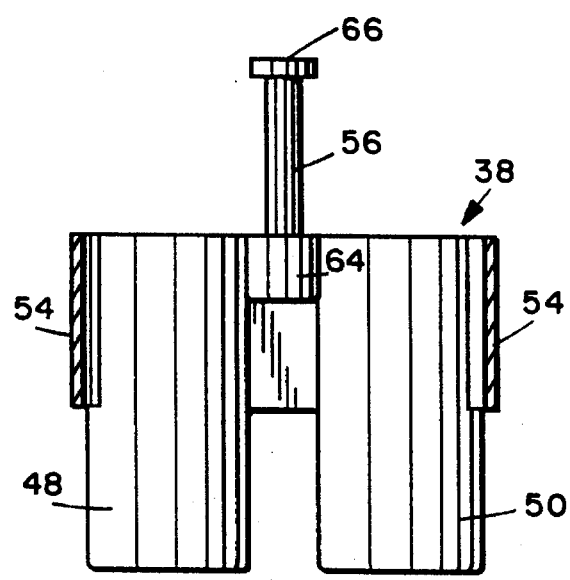
FIG. 4A is a partial side elevation of a pair of water rod bosses incorporated in the upper tie plate illustrated in FIG. 3.

With specific reference to FIGS. 4A and 4B, the double boss 38 includes a center post 56 extending upwardly from a hole 58 at the center point of the web 52, aligned with and laterally between the water rod boss centers 60 and 62. The center post 56 may be assigned for threaded engagement with the upper tie plate. The thickened web 52 also includes a projection 64 extending forwardly of the double boss 38 and formed with a hole 66 on a vertical center axis which is located forwardly of and parallel to the hole 58 and also parallel to the axes of the water rod boss centers 60, 62. Projection 64 extends axially only a relatively small portion of the height of the double boss 38, as best seen in FIG. 4A. As also seen in FIG. 4A the center post 56 is provided with an enlarged diameter removable cap 66.

Figure 5B:
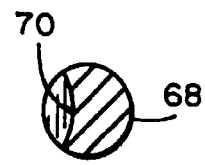
FIG. 5B is a section taken along the line 5A—5A of FIG. 5.
Figure 5A:
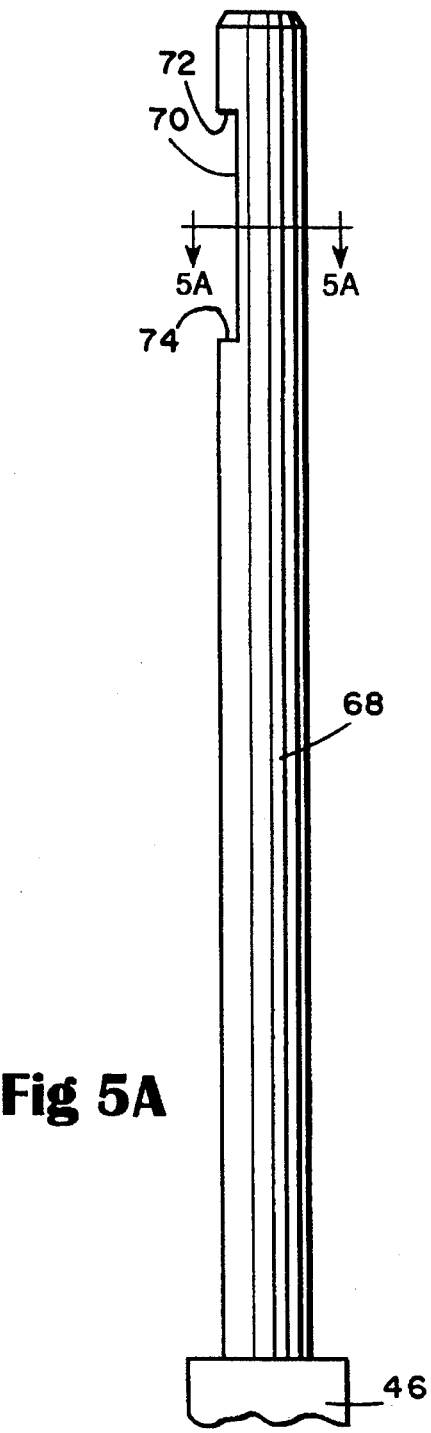
FIG. 5A is a partial side elevation of a water rod and associated end plug in accordance with this invention.

Turning now to FIGS. 5A and 5B, the upper end of a water rod 46 is shown to include an end plug 68 having an upper end formed with a recessed portion or cut-out 70, the shape of which, in plan, is shown in FIG. 5B and the axial extent of which is defined by horizontal shoulders 72, 74. The end plug 68, upon assembly of the upper tie plate 14, will be received in boss hole 50A, for example, and will project above the double boss 38 for cooperation with a latching bar as described further below. Water rod 44 is identical to rod 46 and similar reference numerals are used for the end plug, cut-out, etc.

Figure 6A:
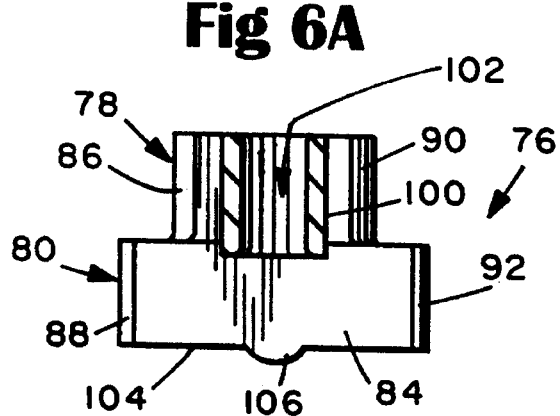
FIG. 6A is a section taken along the line 6A—6A of FIG. 6B.
Figure 6B:
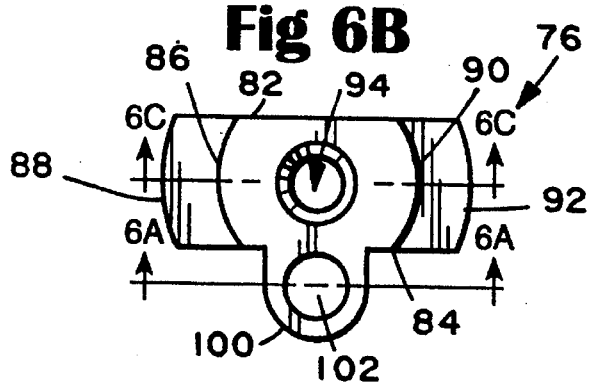
FIG. 6B is a top plan view of a latch bar in accordance with this invention.
Figure 6C:
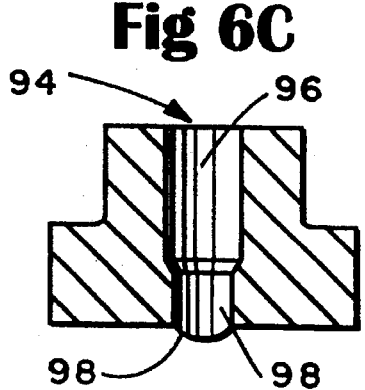
FIG. 6C is a section taken along the line 6C—6C of FIG. 6B.

FIGS. 6A through 6C illustrate a latching bar 76 in accordance with a preferred embodiment of the invention, for use with the double boss 38 and water rods 44, 46. The latching bar 76 may be envisioned as a section cut from the center of a cylinder having an upper part 78 of one (smaller) diameter and a lower part 80 of a second (larger) diameter. Thus, the latching bar 76 is formed by flat sides 82 and 84, and curved ends 86, 88 on one side and similarly curved opposite ends 90, 92 on the opposite side. The lower part 80 may be considered as having oppositely extending lower ends 88 and 92. The bar is formed with a vertically extending central through bore 94, having an upper portion 96 with a first relatively larger diameter, and a lower portion 98 with a second, relatively smaller diameter (see FIG. 6C). The latching bar 76 is also formed with a forwardly extending projection 100 (similar to the projection 64) formed with a hole 102, the center line or axis of which is parallel to and forward of the center axis of bore 94. Hole 102 is also located midway between the curved ends 86, 90.

The lower surface 104 of the latching bar 76 is provided with a centrally located, elongated rib 106, extending between flat sides 82, 84 and across the center hole 94.

Figure 7A:
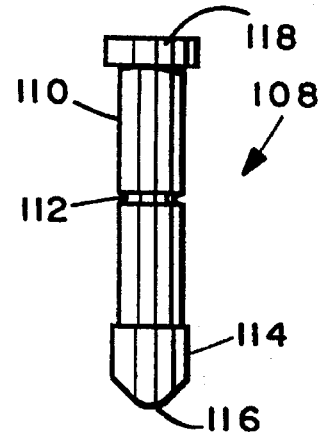
FIG. 7A is a side elevation of a locking pin in accordance with this invention.
Figure 7B:
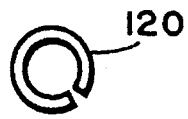
FIG. 7B is a plan view of a split ring intended for use with the locking pin illustrated in FIG. 7.

Turning now to FIG. 7A, a locking pin 108 is shown which includes a main, cylindrical body portion 110, with an annular groove 112 located between the ends of the pin. The lower end of the pin has an enlarged diameter portion 114, tapering to a rounded point 116. The upper end of the pin has an enlarged, removable head or cap 118. The annular groove 112 is sized to receive a split compression ring 120, shown in FIG. 7B.

In a normal assembly procedure, the center post 56 is secured in the hole 58 in the tie plate 14' and the latching bar 76 is then located on the center post, such that the latter extends upwardly through the hole 94. The cap 66 is then reattached to the post 56, thereby securing the latching bar 76 to the tie plate 14'. Locking pin 108 is seated within the hole 102, and it should be noted that cap 118 must be removed so that the pin 108 can be inserted through the hole 102 from below, with enlarged lower end 114 serving as a stop. Once the upper end of the cap protrudes above the upper surface of the latching bar, with ring 120 located as shown in FIG. 8A, cap 118 may be refastened to the pin 108.

Figure 8B:
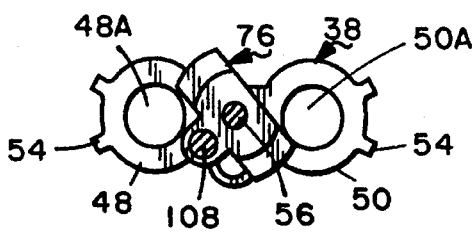
FIG. 8B is a top plan view (partly in section) illustrating the water rod bosses and latching bar shown in FIG. 8A.
Figure 8A:
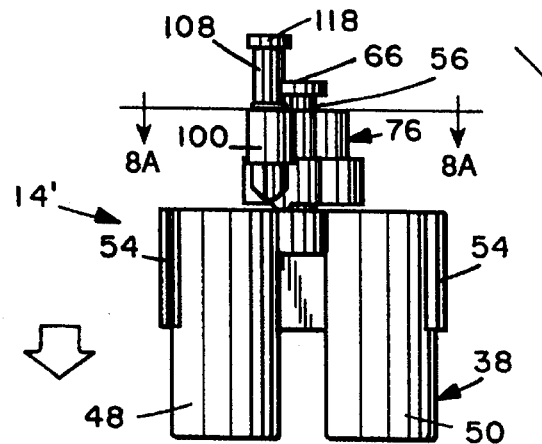
FIG. 8A is an exploded view of the upper portion of the water rods, illustrating the manner in which the water rod end plugs are assembled relative to the water rod bosses in the upper tie plate.
Figure 8A:
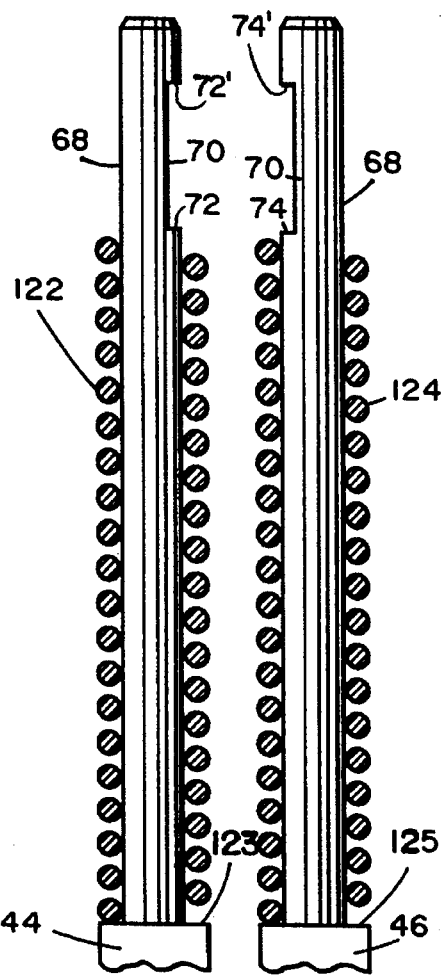
Figures 9A, 9B:
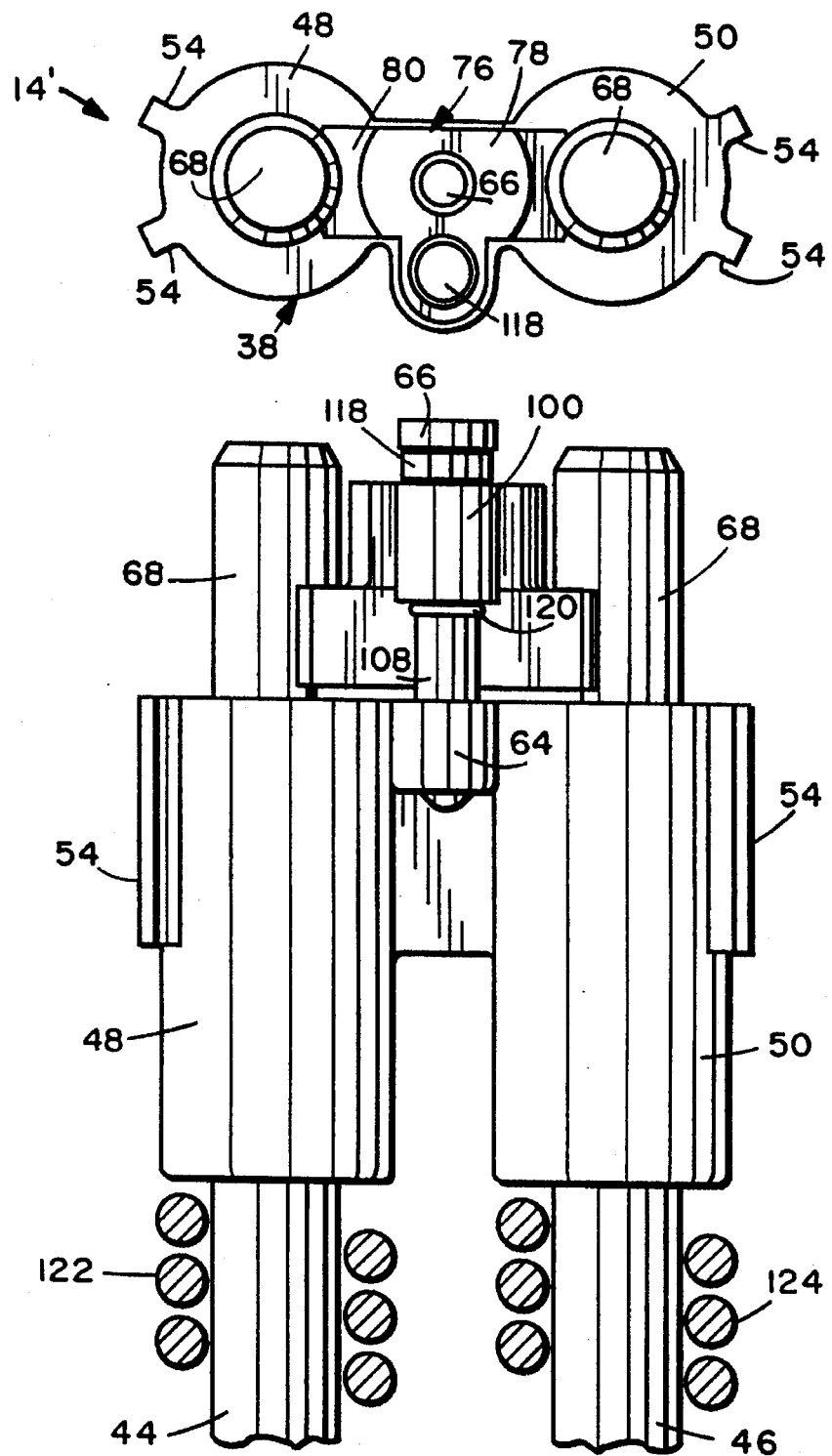
FIG. 9A is a partial side elevation similar to FIG. 8A, but with the assembly shown in the latched position.
FIG. 9B is a top plan view of FIG. 9A.

To install the upper tie plate 14' and to lock the latter to the water rods 44, 46, and with reference also to FIGS. 8A, 8B and 9A, 9B, the upper tie plate 14' is lowered onto the fuel rod bundle including the pair of water rods 44, 46 with respective cut-outs 70 facing each other as best seen in FIG. 8A. A pair of coil springs 122, 124 are seated on horizontal shoulders 123, 125, respectively, at the interface between end plugs 68 and water rods 44, 46. The upper tie plate 14' is moved downwardly over the fuel rods and water rods 44, 46, against the bias of springs 122, 124, and with the end plugs 68 extending upwardly through the boss holes 48A and 50A. Note the angular orientation of the latch bar 76 (in FIGS. 8A and 8B) which is an unlocked assembly position. With reference now to FIGS. 9A and 9B, it will be appreciated that the latch bar 76 can be rotated from the orientation shown in FIGS. 8A and 8B to the orientation shown in FIGS. 9A and 9B such that the lower ends 88, 92 of the latch bar 76 lie within the cut-outs 70 of the end plugs 68. When so located, and upon release of downward pressure on the upper tie plate 14', the coil springs 122, 124 will exert an upward bias on the upper tie plate 14', at the same time biasing the enlarged lower end portion 80 of the latch bar 76 into engagement with shoulders 72', 74' of the cut-outs 70. The upper tie plate 14' is thus secured to the water rods 44, 46 which, in turn, are rigidly secured to the lower tie plate.

The locking pin 108 is then pushed downwardly into the aligned hole 102, radially compressing the ring 120 until the ring passes completely through the hole 102, and then springs outwardly below the projection 100 as illustrated in FIG. 9A. Enlarged lower end 114 is now seated within hole 66 in the projection 64. Ring 120 thus prevents accidental detachment of the pin 108, while the pin 108 itself prevents rotation of the locking bar 76 relative to the boss 38 and thus prevents accidental unlocking of the water rods 44, 46 vis-a-vis the upper tie plate 14'.

An important feature of the invention is the inclusion of the elongated rib 106 along the lower surface 104 of the latching bar 76. It will be appreciated that the latching bar is thus able to rock back and forth, to the left and to the right as viewed in FIG. 9A and 9B, as it rests on the upper surface of the double boss 38 of the upper tie plate 14'. This rocking action is also facilitated by reason of the fact that the center post 56 has a smaller diameter than bores 96, 98 through the latch bar 76. As a result, radiation growth (in the axial direction) of the respective water rods 44, 46 call occur with equal distribution of the lifting load between the two water rods. In other words, the rocking action of the latch bar 76 distributes the lifting load equally between the two water rods 44, 46 and compensates for unequal initial lengths and unequal changes in length caused by irradiation growth during service.

Figure 10A:
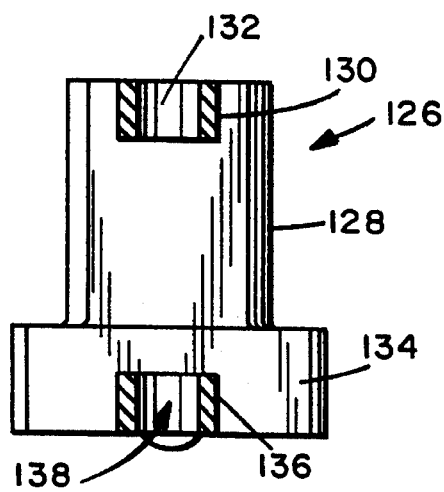
FIGS. 10A through 10C are similar to FIGS. 6A through 6C, but with minor variations in accordance with a second embodiment of the invention.
Figure 10B:
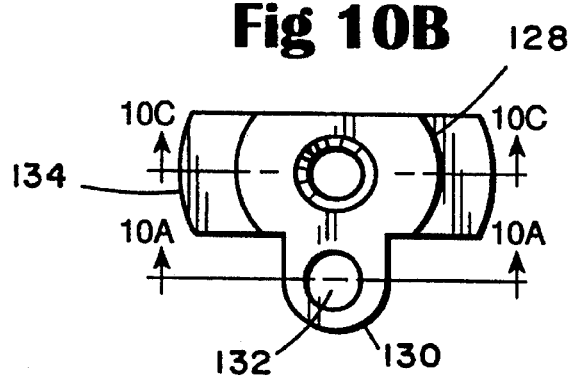
Figure 10C:
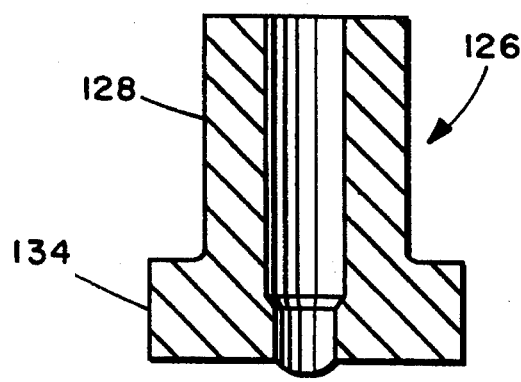

With reference now to FIGS. 10A through 10C, a modified latch bar 106 is shown which is similar in all respects to the latch bar 76, with the few differences noted below To avoid unnecessary duplicative description, only those few differences will be described in detail.

The latch bar includes an extended upper portion 128, with a forwardly extending projection 130 at the upper end thereof, including through hole 132. Lower portion 134 is formed with a forwardly extending projection 136 and associated through hole 138, in vertical alignment with through hole 132. The relatively short axial extents of projection 130 and 136 leaves a relatively substantial axial space therebetween, the purpose for which will be described below.

Figure 11A:
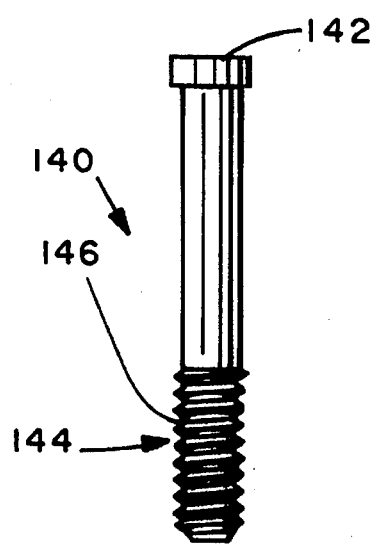
FIG. 11A is a side elevation of a locking pin for use with a second embodiment of the invention.
Figure 11B:
FIG. 11B is a side view of a threaded ring for use with the pin shown in FIG. 11A.
Figure 11C:
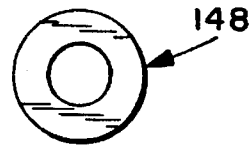
FIG. 11C is a plan view of the ring shown in FIG. 11B.
Figure 12B:
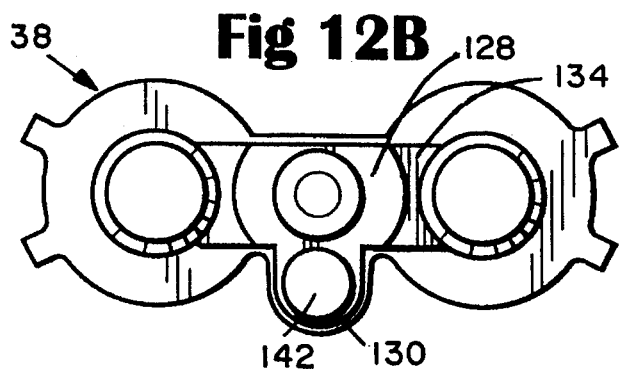
FIGS. 12A and 12B are views similar to FIGS. 9A and 9B but illustrate the second embodiment of the invention in the latched position.
Figure 12A:
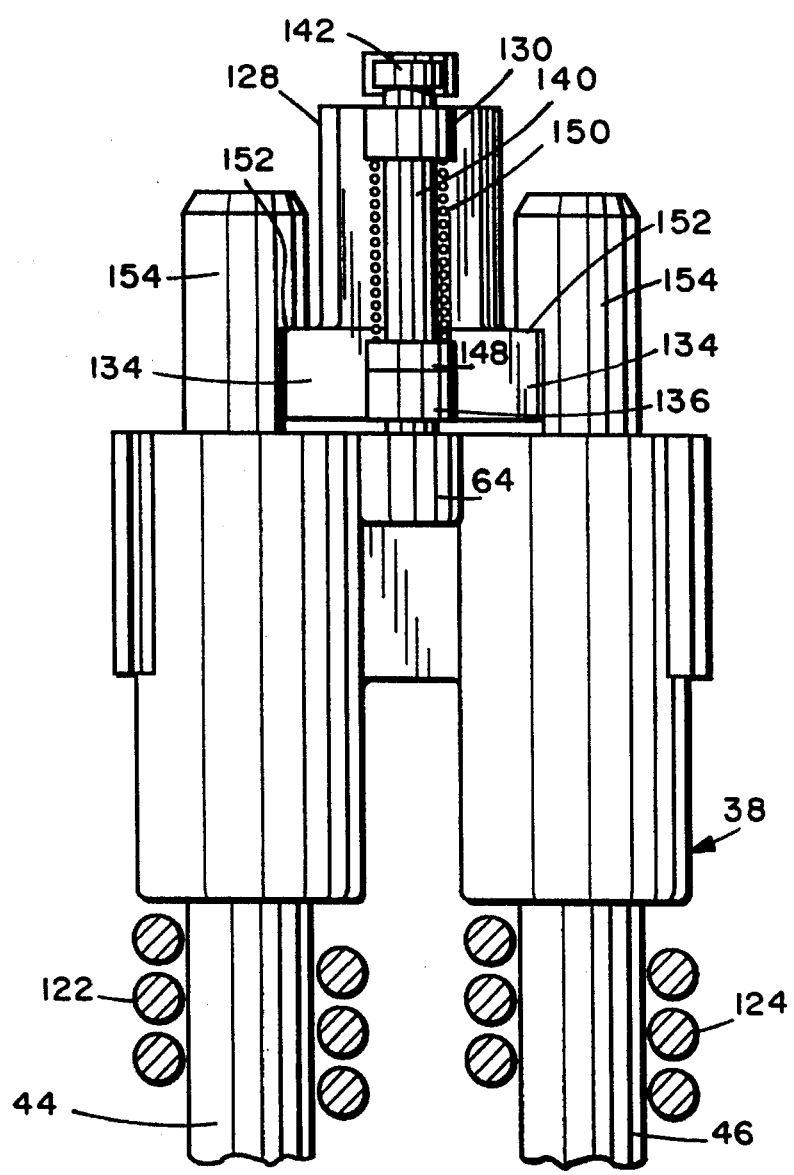

With reference to FIGS. 11A–11C, a locking pin 140 for use with latch 126 is shown to include an enlarged head 142 and a shank 144, partially threaded at 146. A threaded nut or ting 148 is adapted for threaded attachment to the shank. The locking pin 140 is initially inserted through the hole 132, at which point coil spring 150 is slipped over the shank 144 followed by threaded attachment of the ring 148. The lower end of shank 144 is then passed through the hole 138 of projection 136 in this way, the locking pin Coy reason of spring 150 acting between projection 130 and ring 148) is biased downwardly. In this alternative embodiment, and with reference also to FIGS. 12A and 12B, after the latch bar 106 is rotated into the locked position against the biasing forces of springs 122, 124, and with the locking pin 140 held in a raised position, the pin is released and allowed to move downwardly into the aligned hole 66 in the projection 64 of the double boss 38. With the pin 140 resiliently urged into the double boss 38, any relative rotation between latching bar 126 and boss 38 is prevented while, at the same time, the biasing force of spring 150 prevents accidental separation of the pin 140.

Figure 13A:
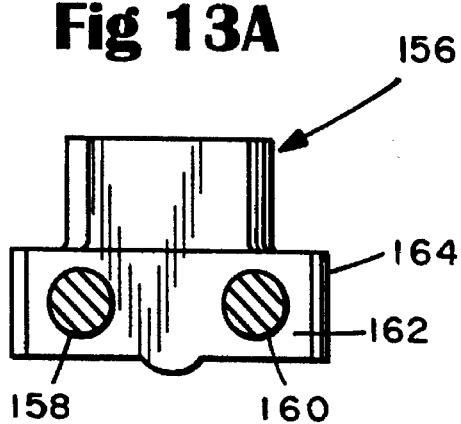
FIGS. 13A through 13C illustrate a latch bar in views similar to FIGS. 6A through 6C but in accordance with a third embodiment of the invention.
Figure 13B:
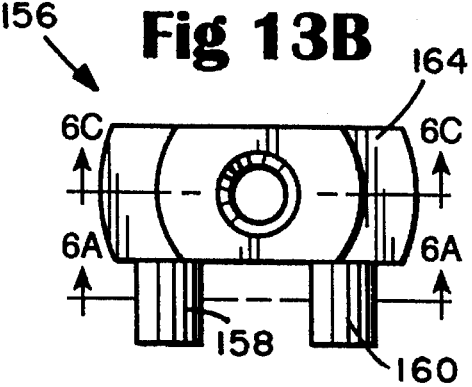
Figure 13C:
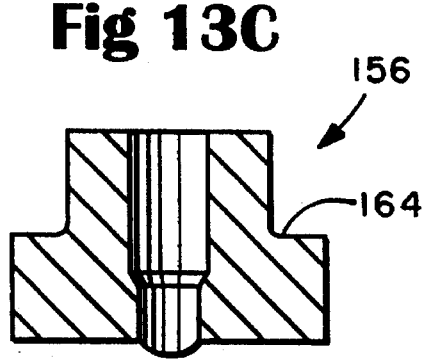
Figure 14:
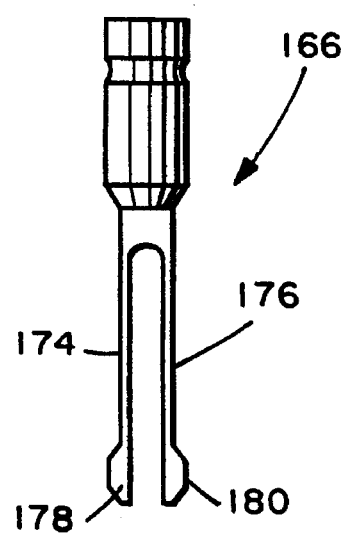
FIG. 14 is a side elevation of a locking pin for use with the third embodiment of the invention.

With reference now to FIGS. 13A through 13C, a third alternative latch bar construction 156 is disclosed wherein, in place of a forward projection (of the type shown at 100 in FIG. 6A and at 130 and 136 in FIG. 10A), a pair of horizontal stops 158 and 160 extend laterally from the flat face 162 of a lower enlarged portion 164 of the latch bar. In this embodiment, a spring finger locking pin 166 (FIG. 14) may be inserted into an elongated hole (not shown) in the projection 168 formed in the modified double boss 170 of the upper tie plate 172 This is done, of course, only after the latch bar 156 is rotated to the locking position shown in FIGS. 15A and 15B. Then, when the locking pin 166 is inserted into the upper tie plate 172, it will extend vertically between the stops 158 and 160, which prevents any significant rotation and thus unlocking of the latch bar 156. Locking pin 166 is formed with resilient spring fingers 174, 176 with enlarged ends 178, 180 which protrude from the projection 168 when fully inserted (see FIG. 15A), thereby preventing accidental removal of the pin by a simple lifting or sliding movement. In other words, spring fingers 174, 176 must be squeezed together before the enlarged ends 178, 180 can pass through the projection 168 in a disassembly direction.

With reference now to FIGS. 16A–16D, another latch bar is shown at 182. The bar 182 includes an upstanding center portion 184, counterbored at 186 to a shoulder 188, with the bore continuing at a reduced diameter through the remaining thickness of the bar. A pair of laterally extending, generally horseshoe-shaped hooks 190, 192 extend laterally away from the center portion 184, with the hooks 190, 192 having rounded water rod engagement surfaces facing in opposite directions.

With specific reference to FIG. 16A, it may be seen that the water rods 194, 196 are formed with annular grooves or cut-outs 196, 198 which are simply reduced diameter portions with beveled entry surfaces 200, 202, respectively. With the latch bar in place on the upper tie plate 204, the former is rotated into the locking position shown in FIG. 16A, and bolt 206 and associated coil spring 208 are employed to secure the latch bar to the tie plate. Insofar as the bolt 206 is threaded into the tie plate 204, and not the latch bar itself, spring biased axial movement of the bar relative to the bolt 204 is permitted to facilitate rotation of the latch bar 182 into the locked position.

FIG. 16D illustrates a variation of the latch bar 182. Specifically, the latch bar 208 is formed with squared water tube engagement surfaces within oppositely facing hooks 210, 212 for use with water rods having a square cross-section 214 in the cut-out or grooved portions. This arrangement provides for even greater locking surface area as between the latch bar 208 and the associated water rods. This arrangement also provides for locked angular orientation of the water rods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel bundle assembly for a nuclear reactor wherein a plurality of fuel rods and at least one water rod extend between an upper tie plate and a lower tie plate, the improvement comprising:

an upper end plug secured to the at least one water rod and having a recessed portion defined by upper and lower shoulders; and a latching mechanism for securing the at least one water rod to the upper tie plate comprising a latch bar mounted on an upper surface of the upper tie plate and rotatable into and out of said recess portion in said end plug when said end plug extends above said upper surface of said tie plate upon installation of said upper tie plate on the fuel bundle assembly.

2. The improvement of claim 1 wherein said at least one water rod comprises a pair of water rods and respective end plugs in side-by-side relationship, and wherein said upper tie plate includes a double water rod boss having a pair of apertures enabling at least said end plugs of said pair of water rods to pass through and extend above said upper tie plate, and wherein said latch bar includes laterally opposite portions simultaneously rotatable into and out of opposed recessed portions on the end plugs of said pair of water rods.

3. The improvement of claim 2 wherein said latch bar is free to rock from side to side when the latch bar is rotated into said cut-outs to thereby accommodate radiation growth of said pair of water rods.

4. The improvement of claim 3 wherein a lower surface of said latch bar is formed with a projecting rib extending perpendicular to a centerline between centers of said pair of water rods, said rib in engagement with said upper surface of said tie plate thereby serving as a pivot axis for said latch bar.

5. The improvement of claim 1 and further including a locking pin engageable between said latch bar and said upper tie plate to prevent said latch bar from rotating out of said cut-out.

6. The improvement of claim 2 and further including a locking pin engageable between said latch bar and said upper tie plate to prevent said latch bar from rotating out of said recessed portions.

7. The improvement of claim 5 wherein said locking pin is spring loaded.

8. The improvement of claim 5 wherein said locking pin includes a pair of spring fingers.

9. The improvement of claim 2 wherein said water rod double boss includes a hole located between said apertures for receiving a centering post passing through said latch bar, thereby enabling rotation of said latch bar relative to said upper tie plate.

10. The improvement of claim 2 wherein said water rod double boss includes a projection and a first through hole therein extending parallel to said apertures, and wherein said latch bar includes a second through hole alignable with said first through hole when said latch bar is rotated into said recessed portions: and a locking pin insertable within said first and second through holes to thereby prevent rotation of said latch bar out of said recessed portions.

11. The improvement of claim 1 wherein said at least one water rod comprises a pair of water rods and respective end plugs in side-by-side relationship, and wherein said upper tie plate includes a double water rod boss having a pair of apertures enabling at least said end plugs of said pair of water rods to pass through and extend above said upper tie plate, said laterally opposed recessed portions comprise circumferential grooves in the respective end plugs, and further wherein said latch bar includes a pair of hooks facing in opposite directions and simultaneously rotatable into engagement with said circumferential grooves.

12. The improvement of claim 11 wherein said pair of hooks are provided with rounded water rod engagement surfaces.

13. The improvement of claim 11 wherein said circumferential grooves are each defined by a square base and each hook has a corresponding generally square shaped water rod engagement surface.

14. A fuel bundle assembly for a nuclear reactor including a plurality of fuel rods and a pair of water rods extending between upper and lower tie plates, said fuel rods and said water rods passing through said upper tie plate; a latch bar mounted on said upper tie plate for securing said pair of water rods to said upper tie plate, said latch bar including means for accommodating differential thermal growth of said pair of water rods.

15. The fuel bundle of claim 14 wherein said water rods include end plugs having laterally recessed opposed portions located above said upper tie plate, and wherein said latch bar includes laterally opposite portions simultaneously rotatable into and out of said opposed recessed portions.

16. The fuel bundle of claim 15 wherein said means includes an elongated rib on a lower surface of said latch bar in engagement with said upper tie plate and forming a pivot axis for said latch bar.

17. The fuel bundle of claim 15 and including means for locking said latch bar in a locked position when said laterally opposite portions are located within said opposed recessed portions.

18. The fuel bundle of claim 14 and including means for biasing said upper tie plate away from said plurality of fuel rods and said pair of water rods.

19. The fuel bundle of claim 15 wherein said laterally opposed recessed portions comprise 360° circumferential grooves, and wherein said latch bar is formed with a pair of hooks having rounded water rod engagement surfaces facing in opposite directions.

20. The fuel bundle of claim 15 wherein said laterally opposed recessed portions comprise 360° circumferential grooves, a base of each groove having a substantially square profile, and wherein said latch bar is formed with a pair of hooks having substantially squared slob opening in opposite directions.

* * * * *